July 1, 1952 — A. L. ANDERSON — 2,601,878
TABLE SAW WITH PART OF THE TABLE SWINGABLY
AND LATERALLY ADJUSTABLE
Filed March 8, 1946 — 3 Sheets-Sheet 3
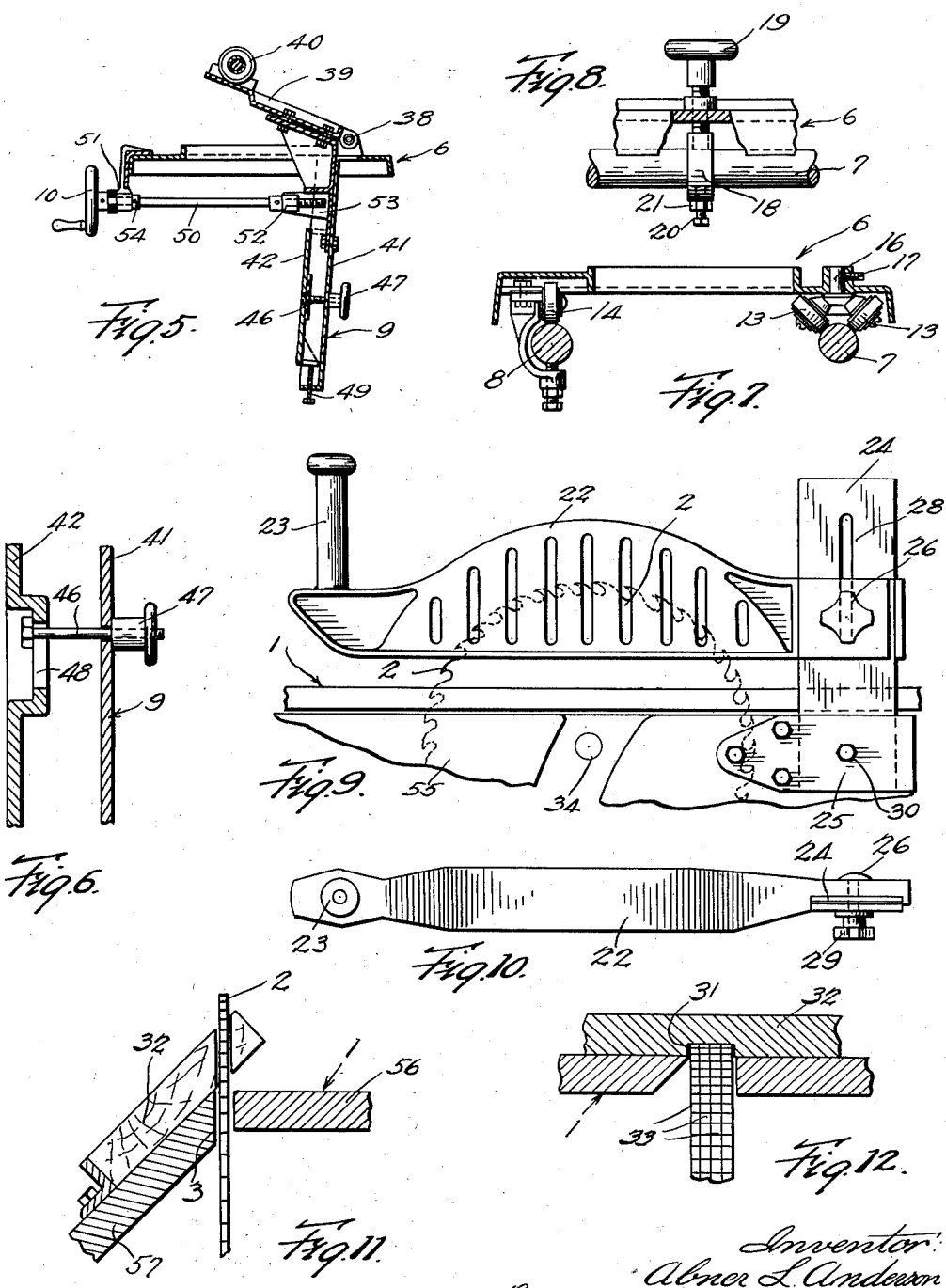

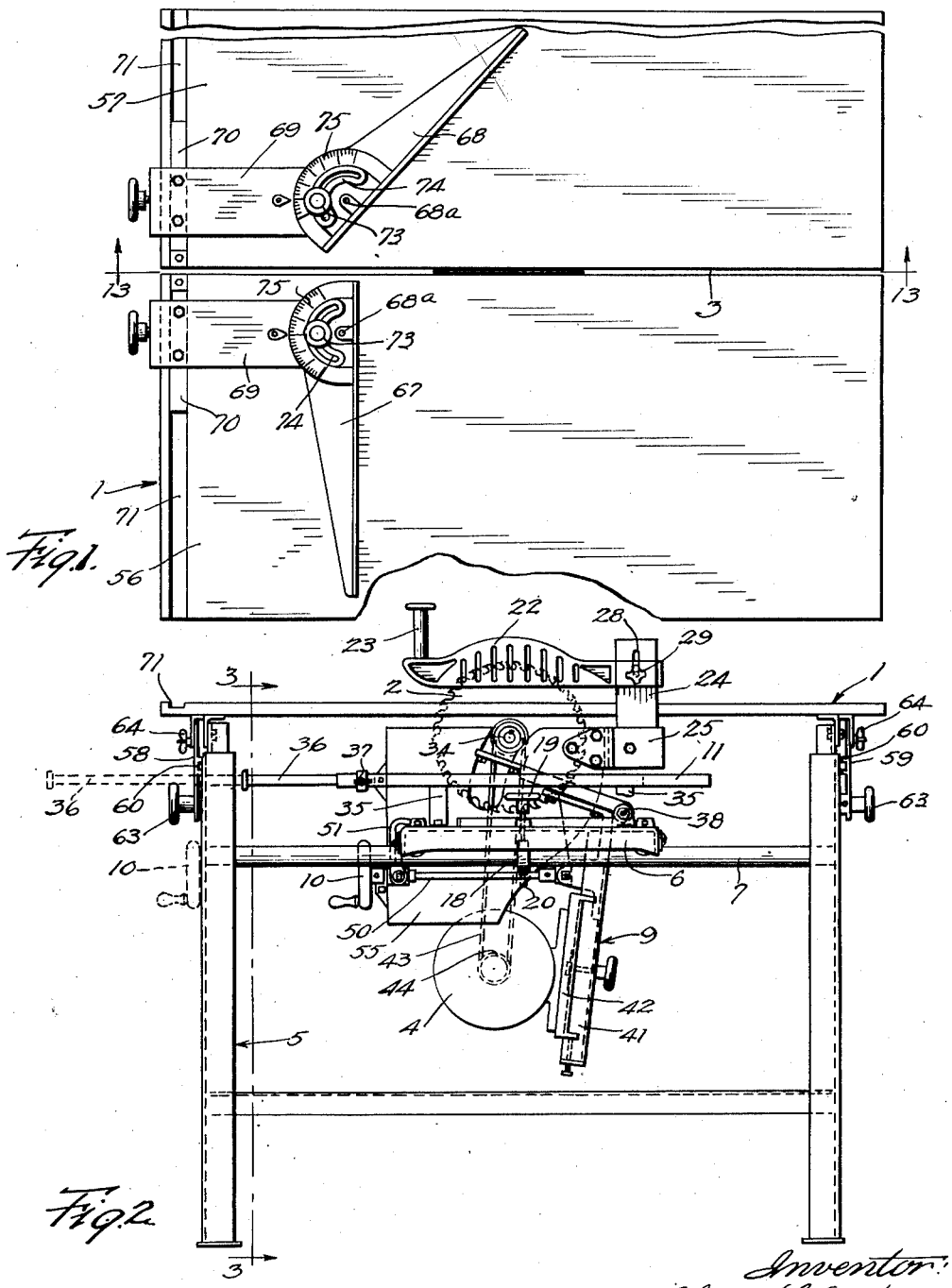

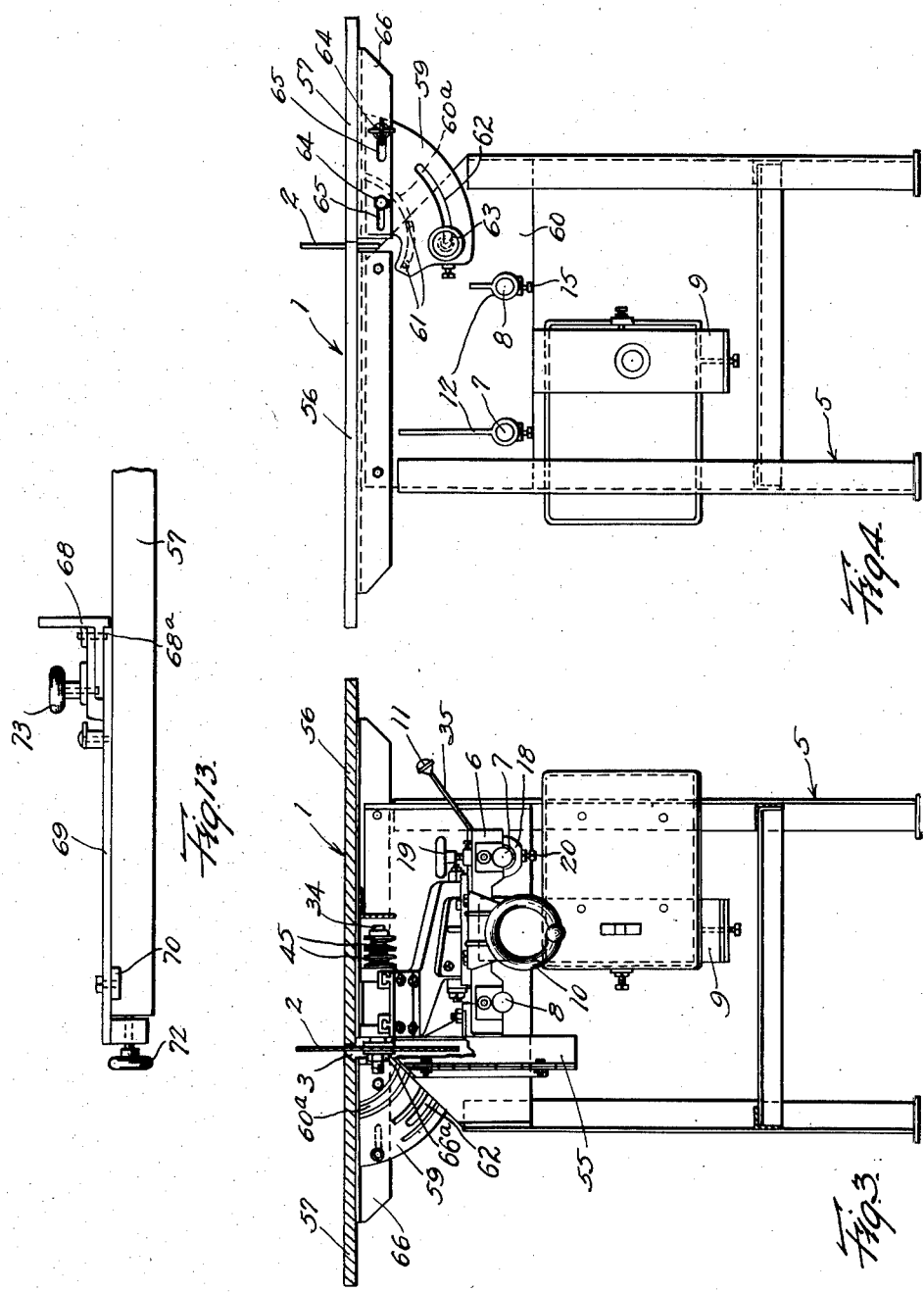

Patented July 1, 1952

2,601,878

UNITED STATES PATENT OFFICE 2,601,878

TABLE SAW WITH PART OF THE TABLE SWINGABLY AND LATERALLY ADJUSTABLE

Abner L. Anderson, Fairfield, Iowa, assignor to St. Paul Foundry & Manufacturing Co., St. Paul, Minn., a corporation of Minnesota Application March 8, 1946, Serial No. 652,846

3 Claims. (Cl. 143—132)

My invention relates to table saws.

One of the objects of my invention is to provide an improved bench or table saw in which the saw is mounted on a movable carriage and in which improved guide rails and rollers for the saw carriage are provided.

Another object is to provide improved means for securing the saw and carriage against movement on the guide rails when it is desired to move the work toward the saw instead of moving the saw toward the work.

A further object of my invention is to provide a bench or table saw in which a portion of the table is mounted for swinging movement and for lateral sliding movement.

Another object is to provide an improved bench or table saw of the movable carriage type, capable of performing dado work, having an operating member for operating the movable carriage which can be operated from either end of the table.

A further object is to provide an improved bench or table saw of the movable carriage type having means for adjusting the height of the saw, readily accessible for operation from the front of the table when the carriage is drawn forward.

A further object is to provide a bench or table saw having an improved miter gauge.

Further objects and advantages of the invention will be apparent from the description and claims.

In the drawings, in which an embodiment of my invention is shown,

Figure 1 is a plan view of a bench or table saw embodying my invention;

Fig. 2 is a side elevation of the saw shown in Fig. 1;

Fig. 3 is a section substantially on the line 3—3 of Fig. 2, parts being omitted;

Fig. 4 is an elevational view from the right of Fig. 1, parts being removed;

Fig. 5 is a vertical fore-and-aft sectional view showing the saw carriage;

Fig. 6 is an enlarged view showing a portion of the motor mounting;

Fig. 7 is a transverse vertical sectional view of the saw carriage and guide rails;

Fig. 8 is a detailed sectional view showing the carriage clamp;

Fig. 9 is an enlarged view showing the saw guard, the guard post and associated parts;

Fig. 10 is a plan view of the saw guard;

Fig. 11 is a vertical transverse sectional view showing a portion of the table in tilted position;

Fig. 12 is a transverse sectional view showing the saw used for dado work; and

Fig. 13 is an elevational view substantially on the line 13—13 of Fig. 1.

Referring to the drawings in detail, the construction shown comprises a bench or table saw having a two-part work supporting table 1, a rotary saw 2 movable back and forth in slot 3 in said table, a motor 4 for said saw, a four-legged frame 5 for supporting the table, a carriage 6 mounted for movement back and forth underneath the table, a pair of rails 7 and 8 on which the carriage 6 is rollably mounted, a base 9 rockably mounted on said carriage on which base said saw and motor are mounted so as to raise or lower the saw with respect to the table, a crank wheel 10 for effecting rocking movement of the base 9, mounted on the carriage 6 and movable therewith to a position where it is accessible to an operator standing at the front end of the table, and a push-pull rod 11 secured to the carriage 6 and movable therewith and accessible to an operator standing at the front end of the table.

Carriage movement

The guide rails 7 and 8 for the rolling carriage are circular in cross section, as shown in Figs. 7 and 8, and are mounted in suitable brackets 12 secured to the end plates of the supporting frame. When a rail becomes worn, it may be angularly adjusted in these supporting brackets to bring new lines of contact into position for engagement by the rollers 13 and 14 on the carriage by loosening the set screws 15 and turning the rails 7 and 8 slightly and then tightening up the set screws 15.

The rail-engaging rollers 13 for one of the rails 7 include two pairs of rollers, the rollers of each pair straddling the rail 7 to hold the carriage against transverse movement. The mounting for each pair of rollers 13 includes a vertical shank 16 secured in an opening in the carriage frame by means of a set screw 17 and two downwardly diverging journal members on which the rollers are mounted, respectively. It will be seen that these rollers straddling the rail will hold the carriage against lateral movement.

In order to take care of any slight variations in the distance between the two rails, the rollers 14 for engaging the other rail 8 are mounted so that their axes are horizontal, thus insuring engagement of the face of the rollers with the rail regardless of any slight variations in the distance apart of the rails 7 and 8.

It may sometimes be desirable to secure the carriage 6 and the saw 2 carried thereby against movement along the rails when it is desired to move the board with respect to the saw rather than to move the saw with respect to the board. For holding the carriage stationary, a clamping device is provided, including a clamping ring 18 through which the guide rail 7 extends, which ordinarily slides freely along this guide rail as the carriage travels, a clamping screw 19 having a threaded engagement with the carriage 6 and also having a threaded engagement with the upper portion of the clamping ring 18, and a second clamping screw 20 having a threaded engagement with the lower portion of the clamping ring 18 and having its point engageable with the lower side of the guide rail 7. A lock nut 21 may be provided for holding this clamping screw in adjusted position. Since the clamping screw 19 has threaded engagement both with the carriage frame and the clamping ring 18, turning movement of the clamping screw does not effect any vertical adjustment of the clamping ring but does cause engagement or disengagement of the point of the clamping screw 19 with the guide rail. The lower clamping screw 20 may be adjusted and set so that it barely clears the lower side of the guide rail as the carriage is moved back and forth. When it is desired to secure the carriage against rolling movement, the upper screw 19 is tightened down, causing the point to engage the upper side of the guide rail 7 and clamp the guide rail between the points of the two opposed screws 19 and 20.

The saw is designed to take care of either (1) sawing the piece of wood completely in two, or (2) cutting dadoes, in which operation grooves are cut in the wood without sawing the piece completely in two. Where the piece is to be sawed completely in two, a saw guard 22 (Figs. 2, 9 and 10) is secured in place to shield the upper portion of the saw, this saw guard being secured to the rollable saw carrying carriage 6 and provided with a handle 23 by means of which the saw carriage may be moved back and forth to move the saw into and out of engagement with the piece to be sawed. This guard 22 is mounted on a thin guard post 24 which is mounted on a guard support 25 secured to the rollable carriage 6. The post 24 is thin enough to enter the kerf formed by the saw so as not to interfere with the feeding movement of the saw carriage. The handle guard may be adjusted vertically to take care of different thicknesses of board or different sizes of saws by means of a clamping bolt 26 which passes through registering openings in the guard 22 and also through a vertical slot 28 in the guard post 24. By loosening the hand nut 29 on the bolt 26, the guard 22 may be moved to the desired position of vertical adjustment and then secured by tightening up the nut. The post 24 may be detachably secured to the support 25 by means of a cap screw 30 extending through a hole in the support 25 and threaded into the post 24.

For dado work, the guard post 24 and guard 22 are removed from the guard support 25, the saw is adjusted vertically by means of the hand wheel 10 to cut the desired depth of groove or rabbet in the under face of the board, the board is placed and held in position and the carriage 6 and saw 2 are shifted along the rails 7 and 8 by means of the pull rod 11 to cut the desired groove 31 in the bottom face of the board 32 (Fig. 12). Any usual or suitable set of dado cutters 33 may be secured on the saw shaft 34 to cut any desired shape of groove.

The pull rod 11 for operating the rollable carriage 6 may be mounted on suitable brackets 35 extending laterally and upwardly from the carriage frame 6. The pull rod may be provided with a detachable handle 36 which may be secured selectively at either end of the pull rod 11 so that the carriage 6 may be operated either from the front or rear of the table as desired. For this purpose, the pull rod may be made tubular to receive the end of the handle which may be secured in either end of the tubular pull rod by means of a suitable clamping screw 37.

Saw adjustment

The vertical adjustment of the saw is effected by means of the hand wheel 10 mounted on the carriage 6, which hand wheel is so mounted that when the carriage is pulled forwardly, the hand wheel will be in convenient position for operation by one standing at the front of the table, as shown in dotted lines in Fig. 2.

The saw 2 and the motor 4 for driving the saw are mounted on a base or support 9 which is rockably mounted at 38 on the rollable carriage 6. This support 9 comprises a bracket 39 on which the bearings 40 for the saw shaft 34 are mounted, and a motor support 41 on which the motor base support 42 for the drive motor 4 is mounted. In order to secure the proper tension in the drive belt 43 between the motor pulley 44 and the pulley 45 on the saw shaft 34, the motor base support 42 is made longitudinally adjustable on the motor support 41 by means of a clamping bolt 46 and nut 47 (shown in Figs. 2, 5 and 6). The motor base support 42 is provided with a slot 48 through which the shank of the bolt 46 extends, and the bolt 46 extends through a hole in the motor support 41. A thumb screw 49, threaded in the motor support 41, may be provided to limit adjustably the downward movement of the motor base support 42.

The rocking adjustment of the saw 2 and motor 4 is effected by means of a shaft 50 rotatably mounted in a suitable bearing bracket 51 on the carriage 6 to which shaft the hand wheel 10 is secured. This shaft is threaded into a nut 52 which is trunnioned on a bracket 53 formed on the swinging support. A universal joint 54 in the shaft may be provided to take care of the change in position of the shaft due to the swinging movement of the motor support. A sawdust chute 55 (Figs. 5 and 9) may be provided extending up over the lower portion of the saw 2 for delivering the sawdust from the saw.

Table adjustment

The table 1 is made in two sections 56 and 57 (Figs. 1, 3 and 4), one section 56 being fixed and the other 57 being tiltable to enable the making of bevel edges and also adjustable laterally to provide space between the two sections for the passage of a dado set.

To provide for the tilting of the table, a pair of brackets 58 and 59 (Fig. 2) are used, mounted on the end plates 60 of the frame 5 for arcuate movement about the upper edge of the tiltable table section as an axis as shown in Fig. 11. The swinging table section 57 is mounted for lateral sliding movement on these brackets. For the tilting or arcuate movement of the brackets 58 and 59 they are each provided with an arcuate guideway 60a engaging a pair of spaced guide pins or projections 61, equidistant from the slot 3 and secured to the end plates. For securing the brackets 58 and 59 in adjusted position, each is provided with a slot 62, concentric with the guideway 60 and extending through the bracket through which slot extends a hand clamping screw 63 threaded into the end plate.

The table section 57 is mounted for lateral sliding movement on these brackets 58 and 59 by means of a pair of screws 64 which extend through a pair of slots 65 on a supporting angle 66 secured to the lower face of the table section 57. With this construction, the space between the table sections may be adjusted by loosening the clamping screws 64, moving the table section 57 laterally to the desired position and tightening up the clamping screws, as shown in Figs. 3, 4 and 12. This adjustment is sufficient to enable the removal and replacement of the various rotary saw blades 2 and dado sets 33 which may be secured on the left-hand end of the saw shaft 34 by means of the nut 66a.

In order to perform miter cuts on the boards, a pair of miter blades 67 and 68 (Fig. 1) are provided, one on each table section. Each miter blade is pivotally and adjustably mounted at 68a on a miter arm 69 which in turn is laterally adjustable on the table. For effecting this lateral adjustment, the miter arm is provided with a slide 70 which moves in a slideway 71 in the table section. A locking screw 72 (Fig. 13) is provided for holding the slide 70 and miter arm 69 in any position to which they may be adjusted. The miter blades 67 and 68 may be set and clamped in any desired adjusted position by means of a lock screw 73 which extends through an arcuate slot 74 in the miter arm. A suitable indicating scale 75 is provided for indicating the angle of adjustment.

Further modifications will be apparent to those skilled in the art and it is desired, therefore, that the invention be limited only by the scope of the appended claims.

Having thus described my invention, what I claim and desire to secure by Letters Patent is:

1. A table saw comprising a rotary saw shaft on which may be mounted either a circular saw or a set of dado cutters, and a table having two parts spaced apart to provide a clearance slot for the passage of the saw or dado set therebetween, means including arcuate guide means for mounting one of said table parts for pivotal movement to swing downwardly independently of the other table part from a horizontal position substantially about the upper edge of the pivotally mounted table part side of the saw clearance slot as an axis to maintain the upper edge of the clearance slot at a constant height and at a constant distance from the saw during the swinging movement and means for mounting said pivoted table part to move toward and away from said axis to provide proper clearance for either the saw or the dado cutters.

2. A table saw comprising a rotary saw shaft on which may be mounted either a circular saw or a set of dado cutters, a table having two parts spaced apart to provide a clearance slot for the passage of the saw or dado set therebetween, and a carriage on which said shaft is mounted to move the saw or cutter set back and forth in said slot, means including arcuate guide means for mounting one of said table parts for pivotal movement to swing downwardly independently of the other table part from a horizontal position substantially about the upper edge of the pivotally mounted table part side of the saw clearance slot as an axis to maintain the upper edge of the clearance slot at a constant height and at a constant distance from the saw during the swinging movement and means for mounting said pivoted table part to move toward and away from said axis to provide proper clearance for either the saw or the dado cutters.

3. A table saw comprising a saw blade and a table having two parts spaced apart to provide a clearance slot for the passage of the saw therebetween, one of said table parts being mounted to lie in a generally horizontal position, and means including arcuate guide means for guiding the other table part for pivotal movement to swing downwardly independently of the other part from a horizontal position, substantially about the upper edge of the swingable table side of the saw clearance slot as an axis, to maintain the upper edge of the clearance slot at a constant height and at a constant distance from the saw during its swinging movement and means for mounting said swingable table part to move radially toward and away from said axis to vary the width of the slot.

ABNER L. ANDERSON.

REFERENCES CITED

The following references are of record in the file of this patent:

UNITED STATES PATENTS

| Number | Name | Date |
|---|---|---|
| Re. 7,871 | Nichols | Sept. 4, 1877 |
| 179,944 | Nichols | July 18, 1876 |
| 707,675 | Colburn | Aug. 26, 1902 |
| 1,336,799 | Vaughan | Apr. 13, 1920 |
| 1,789,125 | Wilderson | Jan. 13, 1921 |
| 1,762,023 | Longenecker | June 3, 1930 |
| 1,763,478 | Palmeter | June 10, 1930 |
| 1,813,435 | Bentz | July 7, 1931 |
| 1,872,718 | Flanigan | Aug. 23, 1932 |
| 1,988,102 | Woodward | Jan. 15, 1935 |
| 2,062,969 | Dutcher | Dec. 1, 1936 |
| 2,185,304 | Knapp | Jan. 2, 1940 |
| 2,247,314 | Sellmeyer | June 24, 1941 |
| 2,406,514 | Squire | Aug. 27, 1946 |